United States Patent [19]

Andrë et al.

[11] Patent Number: 5,029,782
[45] Date of Patent: Jul. 9, 1991

[54] TWO-PART PIPE BRACKET

[75] Inventors: Guy Andrë, Seyssinet, France; Johannes Kirchgaesser, Efringen-Kirchen, Fed. Rep. of Germany

[73] Assignee: A. Raymond GmbH & Co. KG, Lorrach, Fed. Rep. of Germany

[21] Appl. No.: 511,762

[22] Filed: Apr. 20, 1990

[30] Foreign Application Priority Data

Apr. 22, 1989 [DE] Fed. Rep. of Germany ....... 3913360

[51] Int. Cl.$^5$ .............................................. F16L 3/00
[52] U.S. Cl. ................................. 248/68.1; 248/74.2; 248/74.4
[58] Field of Search ................. 248/68.1, 65, 73, 67.7, 248/74.2, 74.4

[56] References Cited

U.S. PATENT DOCUMENTS

| | | | |
|---|---|---|---|
| 2,843,363 | 7/1958 | Mailander | 248/68.1 |
| 3,526,934 | 9/1970 | Owen, Sr. | 248/68.1 X |
| 3,894,706 | 7/1975 | Mizusawa | 248/68.1 |
| 3,967,094 | 6/1976 | Petersen et al. | 248/68.1 X |
| 4,022,967 | 5/1977 | Bulanchur | 248/68.1 X |
| 4,184,862 | 1/1980 | Waters | 248/68.1 X |
| 4,431,152 | 2/1984 | Reed, Jr. | 248/68.1 X |
| 4,660,790 | 4/1987 | Muz | 248/68.1 |
| 4,840,333 | 6/1989 | Nakayama | 248/68.1 |
| 4,881,705 | 11/1989 | Kraus | 248/68.1 X |
| 4,899,964 | 2/1990 | Sick | 248/68.1 |

FOREIGN PATENT DOCUMENTS 1350571  4/1974  United Kingdom ............... 248/74.4

Primary Examiner—David L. Talbott

Attorney, Agent, or Firm—Finnegan, Henderson, Farabow, Garrett & Dunner

[57] ABSTRACT

A pipe bracket of hard-flexible plastic for holding at least two parallel running pipelines, comprising two substantially identically shaped parts that can be assembled together to form the bracket, each part comprising a base member, at least two spaced retaining grooves in the base member for receiving at least two pipelines in parallel relationship, a flexible clamping inner leg extending upwardly from said base member between adjacent pipelines and two outer flexible clamping legs extending upwardly from said base member along the outer sides of the two outermost pipelines, each of said inner and outer legs forming with an adjacent leg and at least a portion of the axial length of a retaining groove, a U-shaped holder for holding a pipeline, each of said legs having a slanted surface as its upper end for guiding a pipeline into a holder and having a laterally protruding flexible detent at the end of said slanted surface that extends partly over the opening of the holder and engages the pipes' circumference to clamp a pipeline in said holder, resilient locking barbs on the upper ends of the outer clamping legs and complementary counter-hooks in the base member for locking engagement with the barbs of the part when the two parts are assembled together, the clamping legs extending over only a portion of the axial length of the retaining grooves so that when one part is inverted and pressed down onto the other, the clamping legs of one part will be offset from the clamping legs of the other part in the axial direction and will pass by one another when the parts are assembled as a bracket.

10 Claims, 2 Drawing Sheets

TWO-PART PIPE BRACKET

BACKGROUND OF THE INVENTION

The invention relates to a two-part pipe bracket of hard-flexible plastic for the mutual fixing of at least two adjacently running pipelines.

This pipe bracket, known for example from DE 24 46 133 A1, is preferably used in automobile construction in order to connect metallic fuel lines, which are prebent according to their intended use and aligned with respect to one another to ensure that the geometry of the thus prefitted line assembly is retained until installation by the fitter. The pipe bracket must in this case securely embrace the fuel lines and also must not become detached of its own accord subsequently during operational use, in view of the engine or chassis vibrations.

With a view to a more compact design of the pipe bracket, the invention is based on the object of designing the form of the bracket in such a way that, on the one hand, the center-to-center distance of the retaining grooves, and consequently the laying width of the pipelines, is kept as small as possible and, on the other hand, the pipe bracket parts can be produced as simply and cost-effectively as possible by the injection-molding process.

These objects are achieved according to the invention in the case of the bracket mentioned at the beginning by the securing clip having the same flexibly expandable clamping legs, the latter being arranged offset with respect to the clamping legs of the receiving part in the axial direction of the retaining grooves in such a way that they pass by one another when the two bracket halves are closed.

By these features the securing clip not only is connected directly to the receiving part via the barbs, but at the same time is also firmly clamped on the pipelines via the additional clamping legs, so that receiving part and securing clip form a firmly locked unit in the pressed-together state.

With further design modifications, it is possible to have the clamping legs passing by one another in the axial direction to have detents which enter into respectively opposite niches. In this case, the detents are initially pressed apart by the pipes inserted into the retaining grooves, to spring back subsequently again into their initial position, the detents projecting beyond the middle of the pipe frictionally engaging behind the pipeline. At the same time, the barbs on the end regions of the two receiving parts engage in one another, so that the two pipe bracket halves are connected frictionally and solidly with each other. In addition, the pipes are advantageously completely embraced and held within the pipe bracket over its entire length.

It is also an aim of the invention to have the retaining grooves lie as close as possible to one another. For this purpose it is expedient, to make it easier to press the pipelines into the retaining grooves, if the detents are directed alternately to one side and to the other over the width of a clamping leg, the distance between the rear of the detents and the adjacent pipe provided when pressing-in the pipes permitting an easier springing open of the clamping leg.

Further, by a special arrangement of barbs and counter-hooks the securing clip can be given the same form as the receiving part, so that the pipe bracket consists virtually of two identical receiving parts which can be plugged one into the other and which also can still be produced simply and cost-effectively in a casting mold consisting of two mold halves.

It is also possible to fix the hooking elements, in the closed state, in the axial direction of the pipelines, so that an opening of the pipe bracket by axial displacement of one bracket half is impossible.

In another embodiment of the invention, the two assemblable receiving parts have in each case two rows of clamping legs and, offset in the axial direction thereto, two rows of clearances, with the detents being directed to the one side on the clamping legs at the side and to the other side in the case of the middle clamping legs. The clamping leg arrangement of this embodiment offers the advantage over the first-mentioned form that the pipelines are embraced over a greater length within the receiving part and that the centrally arranged clamping legs in the opposite receiving part are in each case surrounded by two aligned clamping legs, so that the two bracket halves are fixed in the axial direction of the pipelines.

BRIEF DESCRIPTION OF THE DRAWINGS

Two exemplary embodiments of the pipe bracket according to the invention are explained in further detail below and are represented in the drawing, in which:

FIG. 13 shows the receiving part with partially inserted pipes and securing clip before pressing-on;

DETAILED DESCRIPTION OF THE INVENTION

Figure 1:
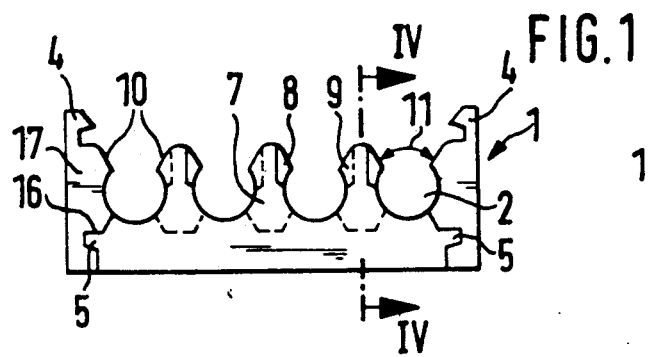
FIG. 1 shows the receiving part of a two-part pipe bracket for four pipelines, in front view.
Figure 2:
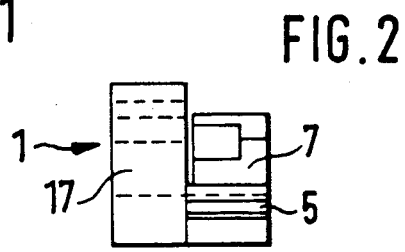
FIG. 2 shows the same receiving part in side view.
Figure 3:
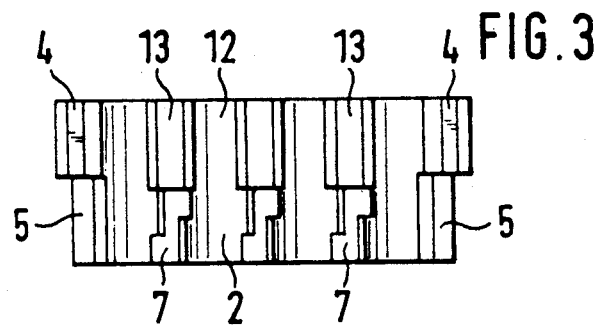
FIG. 3 shows the same receiving part in plan view.
Figure 4:
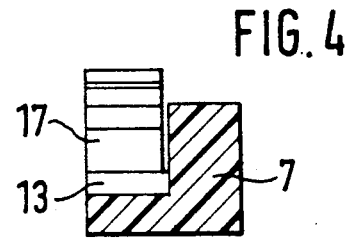
FIG. 4 shows the same receiving part in section according to line IV—IV in FIG. 1.

The pipe bracket shown in the Figures serves for the mutual fixing of adjacently running pipelines and consists of a receiving part 1 with retaining grooves 2, adapted to the pipeline cross sections, and a securing clip 3, engaging over the retaining grooves 2. Said securing clip is provided at both ends with barbs 4 which, in the closed position of the clip 3, engage in oppositely directed barbs 5 on the receiving part 1.

The receiving part 1, shown on its own in FIGS. 1 to 5, has in a base member, according to the number of pipelines 6 to be received, four retaining grooves 2, which are surrounded by flexibly expandable clamping legs 7 to form four U-shaped holders conforming to the cross-sections of the pipelines. The latter have at their ends laterally protruding detents 8 and 9, which engage behind the pipe circumference of the inserted pipes 6 and thereby firmly clamp the pipes. Above the detents 8 and 9, the clamping legs 7 end in slanted walls 10, which slope inwardly in the form of a V to facilitate the pressing-in of the pipelines 6.

Figure 6:
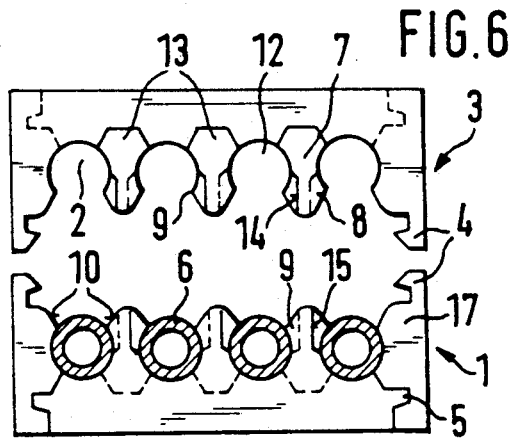
FIG. 6 shows the receiving part with inserted pipes and securing clip before assembly.
Figure 5:
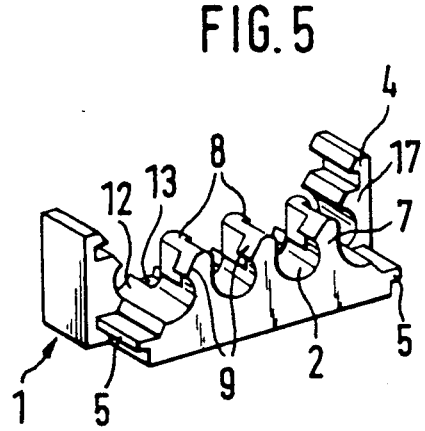
FIG. 5 shows the same receiving part in perspective representation.
Figure 7:
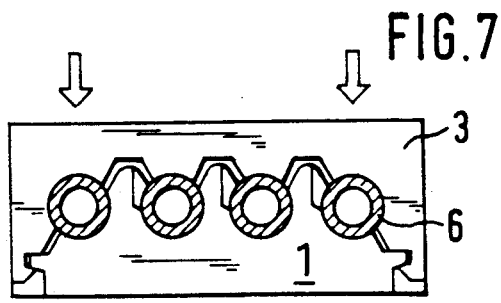
FIG. 7 shows the pipe bracket after assembly, in front view.
Figure 8:
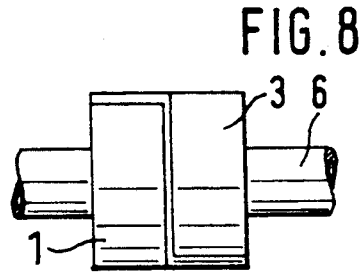
FIG. 8 shows the same assembled pipe bracket in side view.
Figure 9:
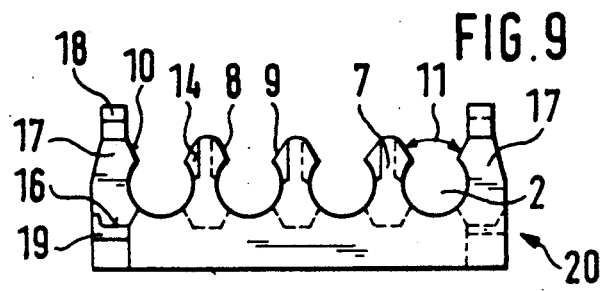
FIG. 9 shows another embodiment of the receiving part in front view.
Figure 10:
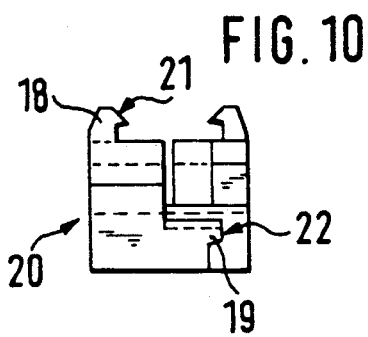
FIG. 10 shows the same receiving part in side view.
Figure 11:
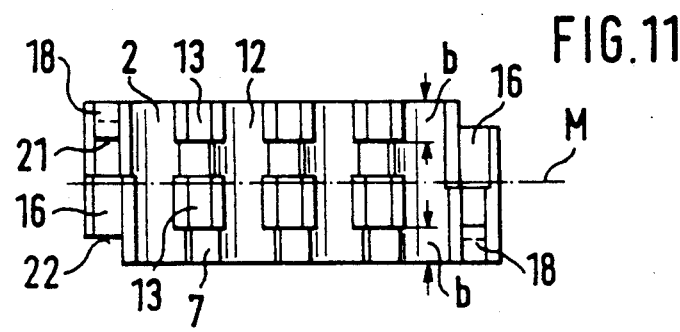
FIG. 11 shows the same receiving part in plan view.
Figure 12:
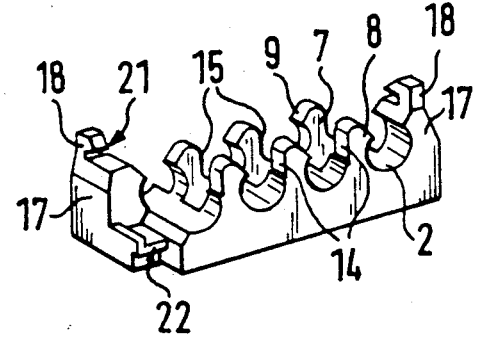
FIG. 12 shows the same receiving part in perspective representation.

The securing clip 3 shown in FIG. 6 above the receiving part 1 is the mirror image of and has the same retaining grooves 2 with flexibly expandable clamping legs 7, which are likewise provided with laterally protruding detents 8 and 9. However, in the pressing-on position, the clamping legs 7 of the securing clip 3 are arranged in an offset manner in the axial direction of the retaining grooves 2 with respect to the identically designed clamping legs 7 of the receiving part 1 in such a way that, when the two bracket halves 1 and 3 are pressed together, the clamping legs 7 pass by one another. In this way, the pipelines 6 to be held are embraced not only by the receiving part 1 but also by the securing clip 3 in a clamping manner by the clamping legs 7, so that the retention together of the two bracket halves 1 and 3 is not only achieved via the hooking means 4 and 5 but is also ensured via the clamping legs 7 in connection with the pipelines 6.

In order to achieve a complete embracing of the pipelines 6 over the entire bracket width, the space 11 remaining free between the sloping walls 10 in the opposite bracket part 1 and 3 respectively can be filled by a retaining groove section 12 adjacent to the pipe circumference, having a clearance 13, of a width and depth which correspond to the form of the sloping walls 10 of the clamping legs 7 entering the clearance 13, which walls protrude beyond the retaining groove sections 12, at the same time having to remain free in each case between two retaining groove sections 12.

Figure 13:
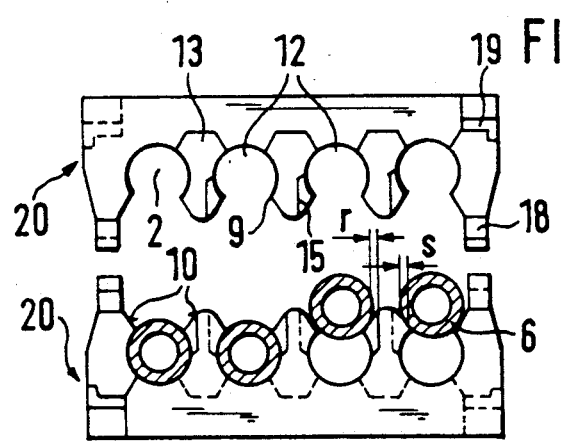
Figure 14:
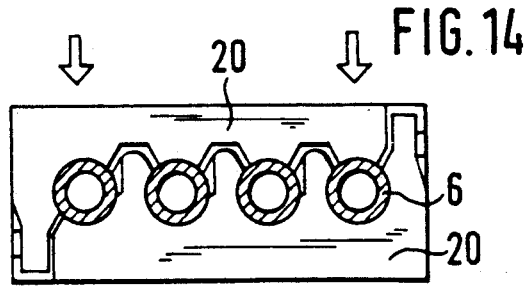
FIG. 14 shows the pipe bracket after assembly, in front view.
Figure 15:
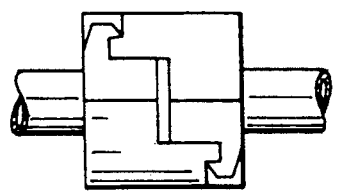
FIG. 15 shows the same assembled pipe bracket in side view.

In the present exemplary embodiment, there are between the adjacent retaining grooves 2 in each case only one clamping leg 7 with detents 8 and 9 protruding from both sides, so that the pipelines 6 can lie as closely as possible to one another. In order to permit the springing open of the clamping legs during pressing-in of the pipelines 6, the detents 8 and 9 must not lie in the same vertical plane but must be directed alternately to one side and to the other of the clamping legs 7 in the axial direction. In addition, the rear walls 14 and 15 behind the detents 8 and 9 respectively in each case run in a straight line past the pipe circumference at the same distance "r" as the detents 8 and 9 engage behind the pipe circumference, so that, when the pipes are pressed in, the clamping legs 7 can spring back by an amount corresponding to the detent projection "s" (FIG. 13).

Although, in view of the frictional connection between the two bracket halves 1 and 3, the hooking means 4 and 5 are not absolutely necessary, they can still provide a greater security as an additional solid connection, only one of the many hooking possibilities being shown in FIGS. 1 to 8. The barbs 4 are in this case on the outer clamping legs 17 above the sloping walls 10 and are directed inward, while the associated counter-hooks 5 are arranged underneath a projecting surface 16 and are directed outward. Since the clamping legs 7 and the clearances 13 in each case take up half the width of the retaining part 1 and of the securing clip 3 respectively, the receiving part 1 can, after corresponding turning about its longitudinal axis, can become a securing clip 3 and be assembled with another receiving part to form a closed pipe bracket. Consequently, only one injection molding has to be made, making the pipe bracket cheaper in production.

In order to make it impossible to open the bracket halves by axial displacement, the barbs 4 lie with the associated outer clamping legs 17 in the row of the clearances 13, whereas the counter-hooks 5 are arranged in the row of the clamping legs 7. As a result, in the closed state of the pipe bracket, the hooking elements 4 and 5 are fixed in the axial direction of the pipelines 6. Consequently, the pipe bracket can only be opened by applying force and destroying it.

In FIGS. 9 to 15, another embodiment of the pipe bracket according to the invention is shown, which the clamping legs 7 are arranged in two rows transversely to the axial direction of the retaining grooves 2. The first row of legs 7 in this case terminates with the outer wall of the receiving part 20, while the second row begins shortly after the middle "M" and ends at the distance of a leg width "b" in front of the other outer wall. The clearances 13 and 16 necessary for "embedding" the clamping legs 7 are accordingly located both between the two rows and beyond the middle row, in each case in alignment with two clamping legs 7 and 17 lying one behind the other.

In the case of this exemplary embodiment, the barbs 18 and counter-hooks 19 are located at the diagonally opposite corners of the receiving part 20, their hooking detents 21 and 22 being directed parallel to the axial direction of the retaining grooves 2. In this case also, the diagonally opposite barbs 18, are formed above the sloping walls 10 of the outer clamping legs 17, while the two counter-hooks 19 are formed underneath the outer clearances 16.

In assembly of the two bracket halves, the centrally arranged clamping legs 7 of one receiving part in each case enter between the two offset-arranged clamping legs 7 of the inversely pressed-on other receiving part 20, so that the two bracket halves 20 are fixed undisplaceably in the axial direction of the retaining grooves 2. The barbs 18 and counter-hooks 19 arranged at the diagonal corners take up little space and complement one another in such a way that the pipe bracket provides a completely solid body in the closed state.

We claim:

1. A pipe bracket of hard-flexible plastic for holding at least two parallel running pipelines, comprising two substantially identically shaped parts that can be assembled together to form the bracket, each part comprising a base member, at least two spaced retaining grooves in the base member for receiving at least two pipelines in parallel relationship, a flexible clamping inner leg extending upwardly from said base member between adjacent pipelines and two outer flexible clamping legs extending upwardly from said base member along the outer sides of the two outermost pipelines, each of said inner and outer legs forming with an adjacent leg and at least a portion of the axial length of a retaining groove, a U-shaped holder for holding a pipeline, each of said legs having a slanted surface as its upper end for guiding a pipeline into a holder and having a laterally protruding flexible detent at the end of said slanted surface that extends partly over the opening of the holder and engages the pipes' circumference to clamp a pipeline in said holder, resilient locking barbs on the upper ends of the outer clamping legs and complementary counter-hooks in the base member for locking engagement with the barbs of the part when the two parts are assembled together, the clamping legs extending over only a portion of the axial length of the retaining grooves so that when one part is inverted and pressed down onto the other, the clamping legs of one part will be offset from the clamping legs of the other part in the axial direction and will pass by one another when the parts are assembled as a bracket.

2. The pipe bracket of claim 1, wherein a detent protrudes over the opening of each U-shaped holder from the legs on both sides of said holder, the opening between said protruding detents in one part being filled by the portion of a retaining groove in the other part where the clamping legs of that part do not exist when the two bracket parts are assembled together, a space being provided along said portion of the retaining grooves for receiving the upper ends of clamping legs of the other part.

3. The pipe bracket of claim 2, wherein the total width of the clamping legs in the axial direction of the retaining grooves is equal to approximately one half the length of said grooves.

4. The pipe bracket of claim 3, wherein each of the inner clamping legs comprise two spaced legs in the axial direction of the retaining grooves, each of said spaced legs having an axial length approximately equal to one-fourth the length of the grooves and being arranged in two parallel spaced rows running transverse to the axial length of the grooves, a first row extending axially from one end of the grooves to a point one-fourth the length of the grooves in from said end and the second row from the midpoint of the grooves to a point one-fourth of the length of the grooves in from the other end of the groove.

5. The pipe bracket of claim 4, wherein each of the two outer clamping legs of each part have one leg in the axial length that extends from one end of the grooves to their midpoint and the other from the other end of the grooves to their midpoint, the barbs on the upper ends of the outer clamping legs of one part and the complimentary counter-hooks on the base of the other facing in a direction parallel to the axial length of the retaining grooves.

6. The pipe bracket of claim 3, wherein the clamping legs have a single width in the axial direction that extends from one end of the grooves to approximately their midpoint.

7. The pipe bracket of claim 6, wherein the detents protruding over the openings of the U-shaped holders from opposite sides of the inner clamping legs extend in an axial direction a distance less than the width of the legs and are axially offset from each other, the side of the leg behind each detent being a flat surface.

8. The pipe bracket of claim 6, wherein the inner clamping legs form one row of legs that is axially offset from a row.

9. The pipe bracket of claim 8, wherein the barbs lie in the row of outer clamping legs and the counter-hooks in the row of inner clamping legs.

10. The pipe bracket of claim 1, wherein the barbs on the upper ends of the outer clamping legs face inwardly in a direction transverse to the axial length of the grooves and the complementary counter-hooks are directed outwardly.

* * * * *

UNITED STATES PATENT AND TRADEMARK OFFICE
CERTIFICATE OF CORRECTION

PATENT NO. : 5,029,782
DATED : July 9, 1991
INVENTOR(S) : Guy ANDRE et al.

It is certified that error appears in the above-identified patent and that said Letters Patent is hereby corrected as shown below:

Claim 5, column 6, lines 8-9, the word "complimentary" should read --complementary--.

Claim 8, column 6, line 24, after "row" insert --of legs formed by the outer clamping legs--.

Signed and Sealed this

Fifth Day of January, 1993

Attest:

DOUGLAS B. COMER

*Attesting Officer*  *Acting Commissioner of Patents and Trademarks*